United States Patent [19]

Momiyama et al.

[11] Patent Number: 4,865,305
[45] Date of Patent: * Sep. 12, 1989

[54] PAPER SHEET FEEDING APPARATUS

[76] Inventors: Toshio Momiyama, No. 11-5, Takaban 2-chome, Meguro-ku, Tokyo; Iwao Mitsuki, No. 4-19, Tobio 2-chome, Atsugi-shi, Kanagawa-ken, both of Japan

[*] Notice: The portion of the term of this patent subsequent to Dec. 12, 2005 has been disclaimed.

[21] Appl. No.: 634,414

[22] Filed: Jul. 25, 1984

[30] Foreign Application Priority Data

Jul. 25, 1983 [JP] Japan ................................ 58-135371
Aug. 11, 1983 [JP] Japan ................................ 58-209478

[51] Int. Cl.$^4$ ............................................. B65H 3/06
[52] U.S. Cl. ...................................... 271/116; 271/4; 400/551; 400/624; 400/625; 400/636; 400/636.2; 192/33 R; 192/41 R; 192/71
[58] Field of Search ..................... 271/4, 10, 114, 115, 271/116; 400/55, 568, 569, 624, 625, 629, 636.2, 620; 192/101, 22, 24, 25, 54, 33, 35, 28, 110 R, 71, 41 R, 45.1

[56] References Cited

U.S. PATENT DOCUMENTS

3,581,856  6/1971  Fleckenstein ...................... 198/28
4,268,021  5/1981  Rutishauser et al. ................ 271/4
4,362,409  12/1982 Endo et al. ....................... 400/625

Primary Examiner—Andres Kashnikow
Assistant Examiner—Matthew C. Graham

[57] ABSTRACT

A paper sheet feeding apparatus includes paper sheet feed rollers of friction type which are unidirectionally driven through a clutch mechanism provided between the paper sheet feed rollers and a platen of a printer to feed, one by one, paper sheets to the platen. The clutch mechanism establishes a coupling relation between them when the platen is driven in a direction in which the paper sheet is taken therein, until a front end portion of the paper sheet is taken therein and then the coupling relation is released by driving the platen in the reverse direction slightly while the front end portion is retracted from the platen.

11 Claims, 6 Drawing Sheets

PAPER SHEET FEEDING APPARATUS

BACKGROUND OF THE INVENTION

This invention relates to an automatic paper sheet feeding apparatus to be used in a relation to an business machine such as printer having a platen, for feeding a number of paper sheets of a certain size automatically successively to the platen.

A typical example of the conventional automatic paper sheet feeding apparatus for feeding a stack of paper sheets piled in a cassette to a platen of a printer successively is shown in U.S. Pat. No. 4,248,415.

In the disclosed apparatus, a front edge of each paper sheet is guided to a paper sheet supply opening of the platen by rotating the platen in a reverse direction to a direction along which the paper sheet is taken in. In the conventional apparatus using roller friction, a length of the paper sheet which is pulled out by a paper separating roll depends upon the quality of the paper sheet, the degree of wear of the paper sheet separating roll and/or the pressing force of the roll. Therefore, when the length is not sufficient, the front edge of the paper sheet does not reach a predetermined position and thus it can not be fed to the platen which is rotated forwardly according to a printing instruction. In such case, the printing position on the paper sheet may not be on a correct line.

In order to resolve this problem, it may be possible to pull out the paper sheet excessively. In such case, however, the front end portion of the paper sheet may contact with the platen rotating rearwardly, causing a noise to be produced and increasing the possibility of damage to the front end portion of the paper sheet. Furthermore, the front end portion of the paper sheet may be repelled by the rearwardly rotating platen and thus it may be bent, which causes the front end portion of the paper sheet to be folded or to be led away from a correct feeding direction.

SUMMARY OF THE INVENTION

This invention was made in view of the above mentioned defects of the conventional paper sheet feeding apparatus and an object of the present invention is to provide a paper sheet feeding apparatus in which a front end portion of the paper sheet derived, by a friction between the paper sheet and a paper sheet feed roller, from a paper sheet cassette is fed automatically to a proper paper sheet feeding position of a platen precisely.

In order to achieve the above mentioned object, according to the present invention, the paper sheet feed rollers are rotatingly driven through a clutch mechanism in a paper sheet feeding direction according to a rotating direction of the platen rotating in the paper sheet feeding direction, until a front end of the paper sheet is pulled into the platen to a predetermined extent, and, then, the platen itself is rotated in the reverse direction for a very short time so that the front end of the paper sheet pulled in the platen is retrieved and the clutch mechanism is disengaged from operation.

Since the paper sheet feeding apparatus according to the present invention utilizes the clutch mechanism capable of connecting the paper sheet feed rollers to and disconnecting them from a driving mechanism so that the paper sheet can be fed only when the platen rotates forwardly, it becomes possible to feed the paper sheet by a proper length thereof stably until the front end thereof can be pulled in the platen. Furthermore, since the front end of the paper sheet once pulled in the platen is re-positioned in a proper paper sheet feeding position with respect to the platen by the slight reverse rotation of the platen for disconnecting the feed rollers from the driving mechanism, the paper sheet can be pulled from the proper position into the platen in a correct feeding direction when the platen is re-started to rotate in the forward direction.

Therefore, according to the present invention, since the front end of the paper sheet can be fed to the platen immediately, there is no possibility of problems of insufficient paper sheet feeding due to slippage of the feed rollers or the bending of the front end of the paper sheet and/or the feeding of the front end of the paper sheet in an incorrect direction which may be caused when the paper sheet is fed excessively to resolve the first mentioned problem.

DETAILED DESCRIPTION OF PREFERRED EMBODIMENTS

The present invention will be described with reference to embodiments shown in the drawings.

Figure 1:
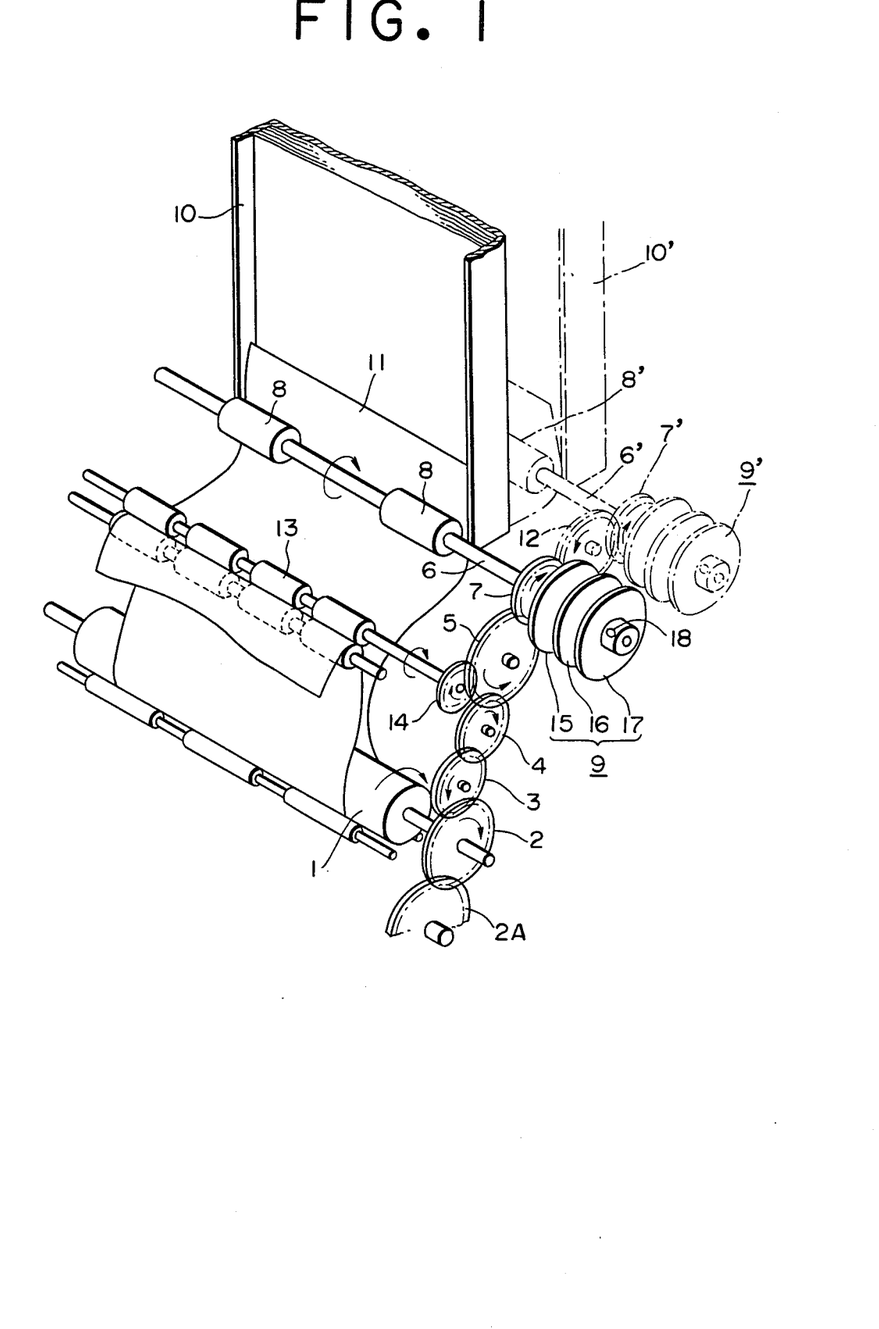
FIG. 1 is a perspective view of a paper sheet feeding apparatus according to an embodiment of the present invention.

In FIG. 1, a platen 1 is rotatingly driven through a platen gear 2 which is meshed with a driving gear 2A. The platen gear 2 meshes with a transmission gear 7 of a paper feed roller shaft 6 through intermediate gears 3, 4 and 5. Mounted on the roller shaft 6 are paper sheet feed rollers 8 of rubber and a clutch mechanism 9 for selectively transmitting a rotation power to the roller shaft. A paper sheet supply cassette 10 contains a stack of paper sheets 11.

When a pair of the supply cassettes 10 and 10' are to be used, another paper sheet feeding roller shaft 6' mounting a transmission gear 7', paper sheet feed rollers 8' and a clutch mechanism 9' which are identical in structure to those mounted on the paper sheet feed roller shaft 6 are provided for the additional sheet supply cassette 10' disposed in parallel with the sheet supply cassette 10 and the transmission gear 7' is drivingly engaged with the transmission gear 7 through an intermediate gear 12, as shown by chain lines in FIG. 1.

The intermediate gear 5 meshes with a gear 14 fixedly mounted on a shaft mounting sheet ejecting rollers 13 for deriving the paper sheet 11 after printing from the platen 1. Although three intermediate gears 3, 4 and 5 are used in the shown embodiment, the number of such intermediate gears is arbitrary so long as rotation of the platen 1, the sheet ejecting rollers 13 and the sheet feed rollers 8 shown by arrows in FIG. 1 are provided, respectively. The rotations of these elements in the directions shown by the arrows in FIG. 1 are in their forward directions, respectively, and the clutch mechanism 9 is designed such that, when one of the paper sheets 11 is derived from the cassette 10 by the rotation of the rollers 8, it is returned to an original home position at which the paper feeding is started after completion of a forward rotation of the platen by an angle corresponding to, for example, 17 printing lines.

Figure 2:
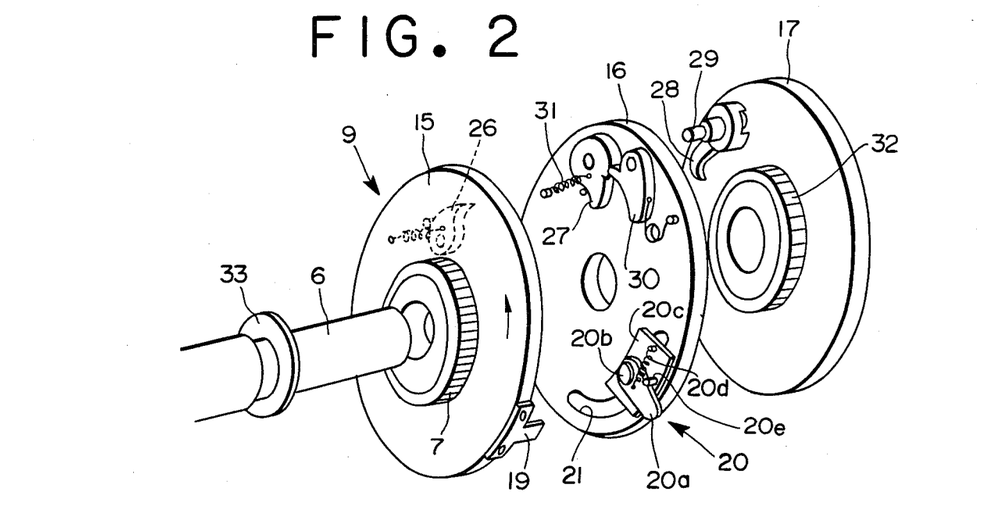
FIG. 2 is an enlarged view of a first embodiment of a clutch mechanism to be applied to the paper sheet feeding apparatus shown in FIG. 1, in a disassembled state.
Figure 3:
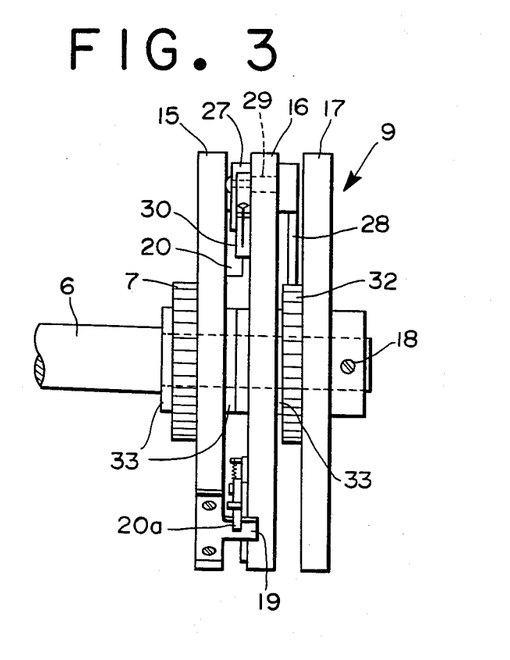
FIG. 3 is a side view of the clutch mechanism shown in FIG. 2.

The clutch mechanism 9 includes three clutch plates 15, 16 and 17 as shown in FIGS. 2 and 3. The clutch plates 15 and 16 are rotatably mounted on the roller shaft 6 and the clutch plate 17 is fixedly mounted on the same shaft by means of a fixing screw 18. The transmission gear 7 on the transmission shaft 6 is shown in FIG. 1 as being provided separately from the clutch plate 15 for simplification of illustration. However, as shown in FIGS. 2 and 3, the transmission gear 7 is practically formed integrally with the clutch plate 15 and thus it is not fixed to the roller shaft 6.

As mentioned previously, the clutch mechanism 9 is automatically returned to the starting position of paper feeding when the platen 1 is rotated forwardly by the angle corresponding to 17 lines. In order to realize this function, the clutch mechanism 9 is provided with a paper supply starting position setting means. The latter means comprises a protrusion member 19 fixed to a peripheral edge of the clutch plate 15 and a detent unit 20 provided on the clutch plate 16 correspondingly to the protrusion member 19. The detent unit 20 has a radially protruding piece 20a which is adapted to engage with the protrusion member 19 when the clutch plate 15 is rotated.

The piece 20a is rotatably supported by a support pin 20b implanted in a base member 20c. The radial piece 20a is biased by a spring 20d having one end connected to the base member 20c and the other end connected to the radial piece 20a to the forward direction of the clutch plate 16 corresponding to the paper sheet pulling direction and the rotation of the radial piece 20a is limited by a stopper pin 20e implanted in the base member 20c. With this construction, the detent unit 20 holds the protrusion member 19 only when the clutch plate 15 rotates forwardly as shown an arrow in FIG. 2.

The detent unit 20 can be regulated in position along an arc slot 21 formed in the clutch plate 16. When the clutch plate 15 rotates forwardly as shown by the arrow, the clutch plate 16 rotates in the same direction due to an engagement of the protrusion member 19 on the clutch plate 15 with the radial piece 20a of the detent unit 20. The position in which the radial piece 20a and the protrusion member 19 contact with each other corresponds to the paper supply starting position.

Figure 4:
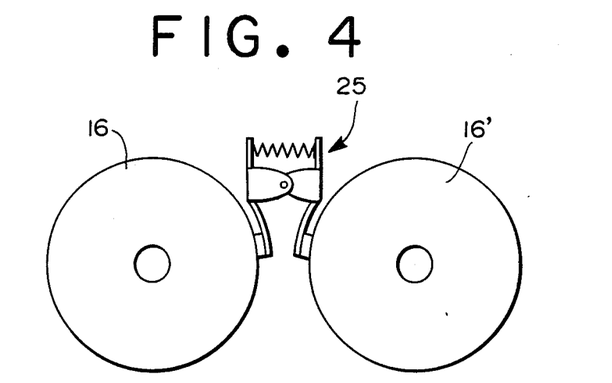
FIG. 4 illustrates a brake mechanism for each clutch mechanism when a plurality of the clutch mechanisms are provided.

In this case, since the clutch plates 15 and 16 are rotatable with respect to the roller shaft 6, the feed rollers 8 can not be rotated. In order to prevent an excess free rotation of the clutch plate 16 with respect to the roller shaft 6 after the sheet supply starting position is determined a small brake force is applied to the clutch plate 16, practically. Such brake force is provided by a brake mechanism 25 shown in FIG. 4. The shown brake mechanism 25 is for applying brake forces to both the clutch plates 16 and 16' when a pair of the clutch mechanisms 9 and 9' are used. It is, of course, possible to modify the brake mechanism 25 such that it applies a brake force to only the clutch plate 16 when only one cassette is used.

When the clutch plate 15 is rotated in a reverse direction to that shown in FIG. 2, the protrusion 19 will contact with the radial piece 20a in the reverse direction. Therefore, the piece 20a can move from the stopper 20e and thus the rotation of the clutch plate 15 is not transmitted to the clutch plate 16.

Figure 5:
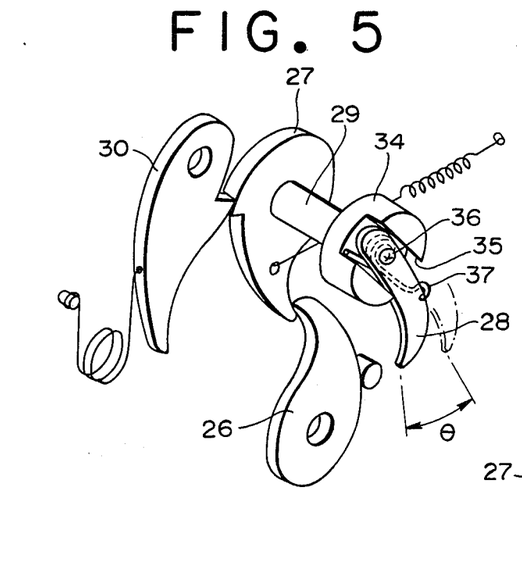
FIG. 5 is a perspective view of a portion of the clutch mechanism shown in FIG. 2, showing a latch mechanism.

The clutch mechanism 9 further includes a coupling means for selectively coupling the clutch plates 15, 16 and 17 together. In FIGS. 2, 3 and 5, the coupling means comprises a feed pawl 26 mounted on the clutch plate 15 in the side of the clutch plate 16, a receiving pawl 27 mounted on the clutch plate 16 in the side of the clutch plate 15 and selectively engageable with the feed pawl 26, a latch pawl 28 mounted on the clutch plate 17 in the side of the clutch plate 16 and engaged through a connecting shaft 29 with the receiving pawl 27 and a ratchet wheel 32 mounted on the clutch plate 17 in the side of the clutch plate 16 and meshed with the latch pawl 28.

In the vicinity of the receiving pawl 27 a lock lever 30 is provided to restrict a rotation of the receiving pawl 27. The latch pawl 28 is usually held by a spring 37 at a position separated from the ratchet wheel 32. In the paper supply starting position, when the transmission gear 7 is rotated in the reverse direction to that shown by the arrow in FIG. 2, the feed pawl 26 of the clutch plate 15 pushes the receiving pawl 27 of the clutch plate 16 to thereby cause the latch pawl 28 to mesh with the ratchet wheel 32. This meshing state is maintained by the lock lever 30 provided in the vicinity of the receiving pawl 27. The latch pawl 28 is disengaged from the ratchet wheel 32 by a further rotation of the feed pawl 26 in the reverse direction by which the feed pawl 26 kicks the lock lever 30 to allow the receiving pawl 27 to return by the spring 31. Therefore, in this case, the respective clutch plates 15, 16 and 17 are in released states and thus the clutch mechanism 9 becomes inoperative. The reference numeral 33 in FIGS. 2 and 3 shows washers for regulating a spaces between the respective clutch plates.

Figure 6:
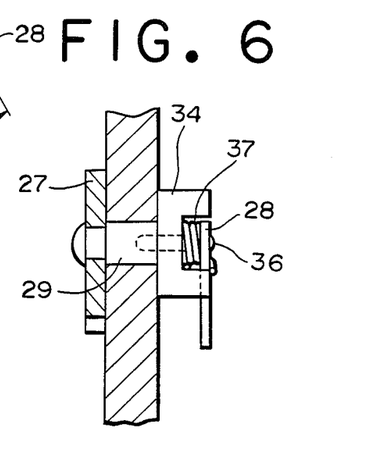
FIG. 6 is a plane view of the latch mechanism shown in FIG. 5.
Figure 7:
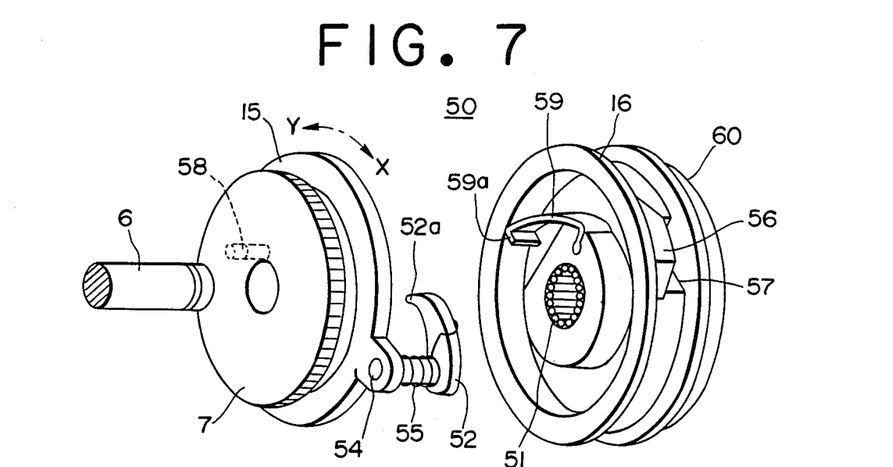
FIG. 7 is a perspective view of a second embodiment of the clutch mechanism in a disassembled state.

FIGS. 5 and 6 shows a relation of the latch pawl 28 to the connecting shaft 29. The connecting shaft 29 is provided at one end thereof with a pawl holder 34 the other end of which is fixedly secured to the receiving pawl 27 and to the clutch plate 16. The pawl holder 34 is formed in an end face thereof with a groove 35 having a width enough to loosely receive the latch pawl 28 which is swingeably supported in the groove 35 by a shaft screw 36. A spring 37 is wound on the shaft screw 36 which biases the latch pawl 28 towards the ratchet wheel 32. Therefore, the latch pawl 28 positioned in the groove 35 can rotate by an angle θ while it is usually held in a position shown by a solid line in FIG. 5.

When the receiving pawl 27 is pushed by the feed pawl 26 and the latch pawl 28 is forced to rotate in the engaging direction, there might be a case that the latch pawl 28 contacts with a tooth portion of the ratchet wheel 32, causing the proper engagement therebetween to be impossible. In such case there might be the latch pawl 28 damaged. The construction of the pawl holder 34 may eliminate the possibility of such problems since the latch pawl 28 can be retracted by a distance enough to pass such tooth. Therefore, the receiving pawl 27 is also locked by the lock lever 30 due to the retraction of the latch pawl 28.

On the other hand, since the latch pawl 28 is biased by the spring 37 towards the ratchet wheel 32 to mesh therewith, a proper meshing is obtained immediately when the clutch plate 16 is forwardly rotated by a forward rotation of the clutch plate 15. Practically, however, there is no possibility of improper meshing because the tooth pitch of the ratchet wheel 32 is very fine.

A relation of the rotation of the platen 1 to the rotation of the paper sheet feed rollers 8 will now be described. The rotation of the platen 1 is performed according to a program previously prepared. The clutch mechanism 9 or 9' is set at the original, i.e., the sheet feeding start position thereof when the paper sheet 11 is derived firstly from the cassette 10 or 10' so that a possible erroneous operation of the clutch mechanism 9 or 9' is cleared at the time when the paper sheet feed is started. Further, the rotation angle of the platen 1 during one forward revolution of the clutch plate 15 is set to a value corresponding to, for example, 17 printing lines as mentioned previously. By setting the rotation angle of the platen 1 in this manner, the clutch mechanism 9 is automatically set to the original point when the platen 1 rotates forwardly by the angle corresponding to 17 printing lines.

When the platen 1 is rotated in the reverse direction by an angle corresponding to 7 printing lines after the 17 lines forward rotation, the clutch plate 15 is rotated in the reverse direction, so that the tip of the feed pawl 26 urges the receiving pawl 27 of the clutch plate 16 counter-clockwisely in FIG. 2. With this operation, the latch pawl 28 engages with the ratchet wheel 32 and this engagement is locked by the lock lever 30. Then the platen 1 is rotated forwardly by the angle corresponding to 7 lines. With this 7 lines forward rotation of the platen 1, the clutch plate 15 is rotated forwardly, so that the protrusion member 19 of the clutch plate 15 is engaged with the radial piece 20a of the clutch plate 16. Thus the original position is restored, in which the clutch plates 15, 16 and 17 are coupled together.

When the platen 1 is rotated forwardly thereafter, it rotates the roller shaft 6 and the feed rollers 8 forwardly through the coupling established in the clutch mechanism 9 and thus it is possible to derive one sheet 11 from the cassette 10 by the rotational friction of the feed rollers 8.

Prior to the subsequent pulling of the derived sheet 11 into the platen 1, it is necessary to make the rotation of the feed rollers 8 free by releasing the coupling of the clutch mechanism 9. In order to do this, the platen 1 is rotated reversely by an angle corresponding to 9 printing lines. With this reverse rotation of the platen 1, the front end portion of the sheet 11 sent to the platen 1 is pushed back and slips with respect to the platen 1 while keeping a tangential contact therewith and thus it is ready to be pulled subsequently in the platen 1.

On the other hand, with the same reverse rotation of the platen 1, the clutch plate 15 is rotated reversely in proportion to the rotation angle of the platen 1, so that the feed pawl 26 kicks the lock lever 30 to release the locking of the receiving pawl 27 of the clutch plate 16 to thereby return the receiving pawl 27 to the original position due to the biasing force of the spring 31. Consequently, the latch pawl 28 is disengaged from the ratchet wheel 32. Thus the clutch mechanism 9 becomes inoperative and the roller shaft 6 is allowed to rotate freely. The clutch plates 15 and 16 are also made free from the roller shaft 6, necessarily.

In this embodiment, since, when the above relation is established by reversely rotating the platen 1 from the original point by the 7 lines angle, the feed pawl 26 urges the receiving pawl 27 so that the latter engages with the latch pawl to establish the coupling condition of the clutch mechanism 9 and, when with the platen 1 rotated reversely by the 9 lines angle, the locking condition of the lock lever 30 is released and the coupling condition of the clutch mechanism 9 is released, the position of the radial piece 20a is made regulatable with respect to the position of the receiving pawl 27. Alternatively, it may be possible to regulate the relative position by making the position of the protrusion member 19 regulatable.

Thus, when the platen 1 is rotated forwardly according to the program, the sheet 11 which is ready to be pulled in the platen at the fixed position with respect to the platen 1 is pulled in the platen 1 by a certain length precisely. In this case, since the clutch mechanism 9 is inoperative, the clutch plates 15 and 16 rotate freely.

On the other hand, since the roller shaft 6 and the feed rollers 8 can be freely rotated, they rotate freely with the movement of the sheet 11 into the platen 1.

The paper sheet 11 pulled in the platen 1 is printed line by line according to the program, the printing line being selected by the forward rotation of the platen 1. When it is necessary to shift the printing line in the reverse direction, the number of the lines to be shifted reversely is limited to 6, because, in this embodiment, the coupling of the clutch mechanism 9 is established by the reverse rotation of the platen 1 by the angle corresponding to 7 printing lines. It is, of course, possible to select a desired back-line by selecting the timing of establishing the coupling of the clutch mechanism 9.

When the sheets are to be supplied from another cassette 10', it is enough to drive the clutch mechanism 9' through the intermediate gear 12. In such case, the clutch mechanism 9' should be set such that the mechanism related to the feed pawl 26 is actuated when the platen 1 is rotated reversely by an angle corresponding to a certain number of the printing lines which is larger than the 7 lines which are necessary to actuate the clutch mechanism 9.

The operation of the clutch mechanism 9 or 9' after its original point is set is merely to repeatedly derive the sheet 11.

FIGS. 7 through 12 show another embodiment of the clutch mechanism.

Figure 8:
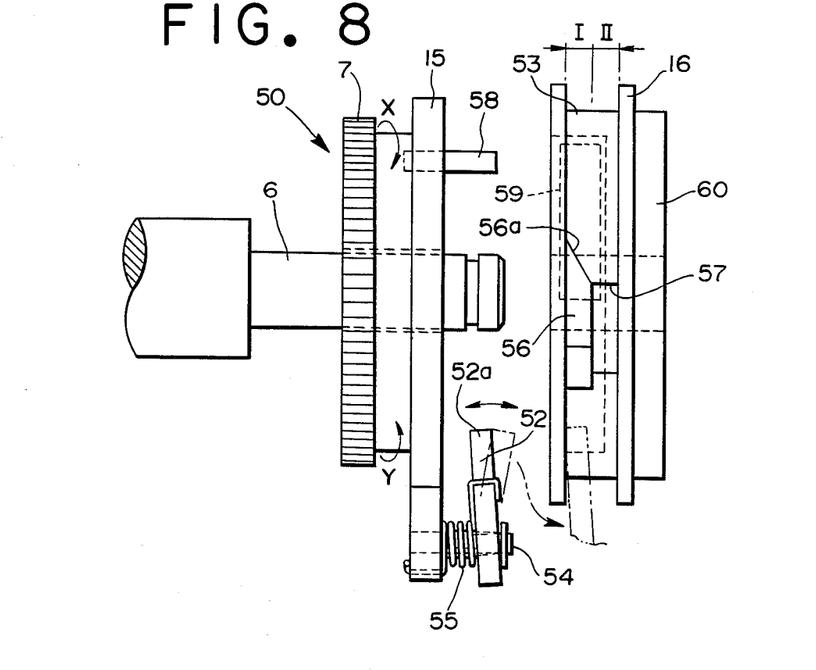
FIG. 8 is an enlarged plane view of the clutch mechanism shown in FIG. 7.
Figure 9:
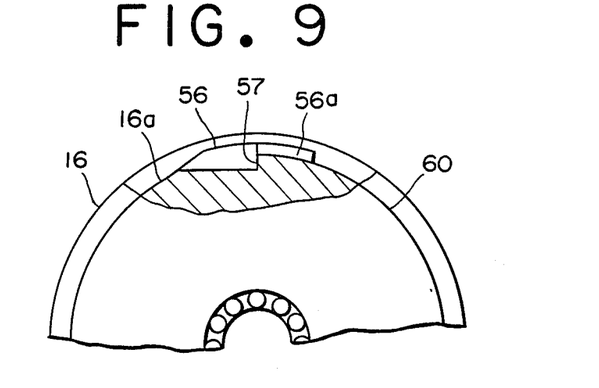
FIG. 9 is a right side, partially cross-sectioned view of a clutch plate of the clutch mechanism shown in FIG. 7, showing nail holes.

In these Figures, a clutch mechanism 50 includes a oneway clutch 51 which corresponds to the clutch plate 17 of the clutch mechanism 9 in FIGS. 1 to 6. The one-way clutch 51 is disposed in between the roller shaft 6 and the clutch plate 16 such that, when the clutch plate 6 is rotated through the clutch plate 15 in a direction shown by an arrow X (FIG. 7), the one-way clutch 51 becomes in a freely rotatable state with respect to the roller shaft 6 and when it is rotated in an opposite direction shown by an arrow Y (FIG. 7), the rotation of the clutch plate 16 is transmitted through the one-way clutch 51 to the roller shaft 6. A coupling means for properly connecting the clutch plates 15 and 16 together comprises a latch pawl 52 implanted in a side face of the clutch plate 15 and a pawl hole 57 formed in a peripheral slide face 53 of the clutch plate 16 along which the latch pawl 52 moves slidingly. The latch pawl 52 is rotatably supported by a shaft 54. A spring 55 is wound on the shaft 54, which biases a top end portion 52a of the latch pawl 52 towards a rotation center of the clutch plate 15. The spring 55 has a further function of biasing the latch pawl 52 towards the clutch plate 15 so that the top end portion 52a of the latch pawl 52 can slidingly move along a first area I of the peripheral slide face 53 of the clutch plate 16 while being leaned against a flange thereof as shown in FIG. 8.

In the first area I, a switch 56 in the form of a land is formed which can be overpast by the latch pawl 52 without contact of the top end portion 52a of the latter therewith. The switch 56 has a cam portion 56a by which the top end portion 52a of the latch pawl 52 is shifted to another second area II of the peripheral face 53 of the clutch plate 16 when the clutch plate 15 is rotated in the direction of the arrow X.

The pawl hole 57 with which the latch pawl 52 is engageable is formed in the second area II. The pawl hole has such configulation that top end portion 52a of the latch pawl 52 is trapped by the pawl hole 57 when the clutch plate 15 is rotated in the direction of the arrow X and then the latch pawl 52 can be engaged with the clutch plate 16 when the clutch plate 15 is rotated in the direction of the arrow Y. The latch pawl 52 dropped in the pawl hole 57 can be escaped therefrom with a further rotation of the clutch plate 15 in the X direction. The latch pawl 52 escaped from the pawl hole 57 is biased again by the spring 55 to the side of the first area I. Therefore, when the clutch plate 15 is rotated in the arrow X direction and the latch pawl 52 is dropped in the pawl hole 57, the latch pawl 52 can escape therefrom after it passes over the side cam face of the switch portion 56 and returned to the first area I to allow the clutch plate 15 to rotate freely, again.

In order to maintain an angle $\theta 1$ between the latch pawl 52 and the pawl hole 57 (FIGS. 10 and 12) during the rotation of the coupled clutch plates 15 and 16, in other words, in order to keep a constant relative position between them even with a certain number of revolutions of the clutch plate 15 in the direction of the arrow X, a home position holding means is provided. The home position holding means comprises a positioning pin 58 implanted vertically to the clutch plate 15 in the side of the clutch plate 16, and a stopper plate 59. The stopper plate 59 has one end portion fixedly secured to the clutch plate 16 in the side of the clutch plate 15 and the other end portion 59a which is free and functions to hold the positioning pin 58 when the clutch plate 15 is rotated in the direction of the arrow X, so that, when the rotation of the clutch plate 15 continues in the same direction, the clutch plate 16 rotates together with the clutch plate 15 due to the engagement between the positioning pin 58 and the free end 59a of the stopper plate 59, freely with respect to the roller shaft 6.

Figure 10:
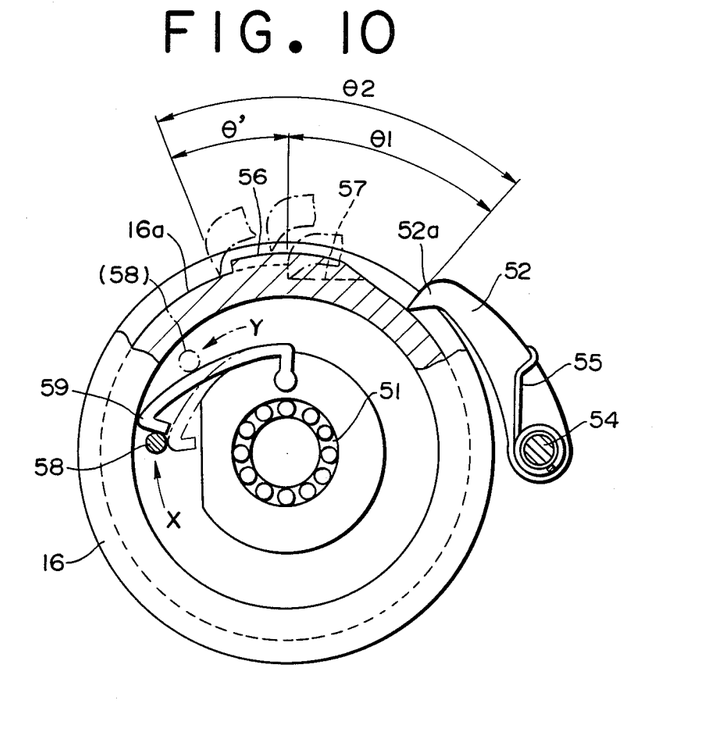
FIG. 10 illustrates a relation between a pin and a stopper for positioning the clutch mechanism shown in FIG. 7.

When the clutch plate 15 is rotated in the direction of the arrow Y, the stopper plate 59 is deformed by the positioning pin 58 to allow the latter pin to pass through and the latch pawl 52 passes over the switch portion 56 as shown in FIG. 10. Therefore, only the clutch plate 15 can rotate freely with respect to the roller shaft 6.

Figure 11:
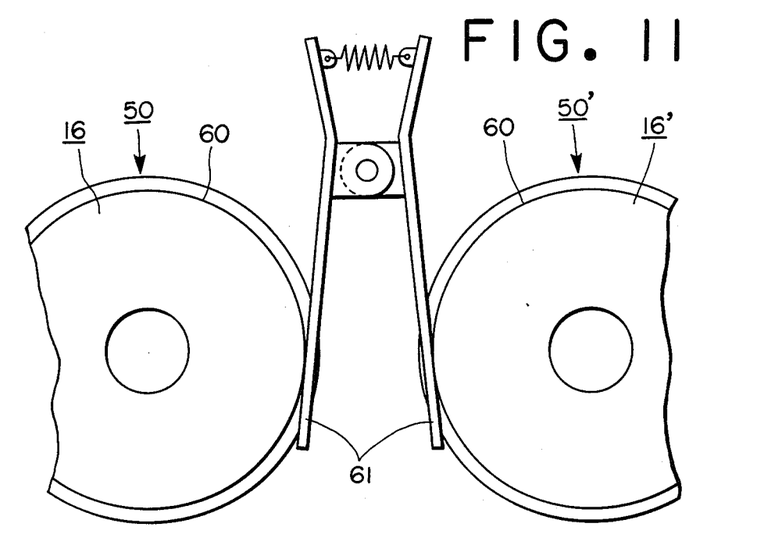
FIG. 11 illustrates a brake mechanism for each clutch mechanism when a plurality of the clutch mechanisms are provided.

The clutch plates 16 and 16' are equipped with brake drums 60, respectively, as shown in FIG. 11. To each brake drum 60, a brake shoe 61 is provided so that the clutch plates 16 and 16' are held stably, usually.

Although not shown, the clutch plates 15 and 16 are supported by the roller shaft 6 freely rotatably with respect thereto through E rings mounted on the roller shaft, respectively.

Figure 12:
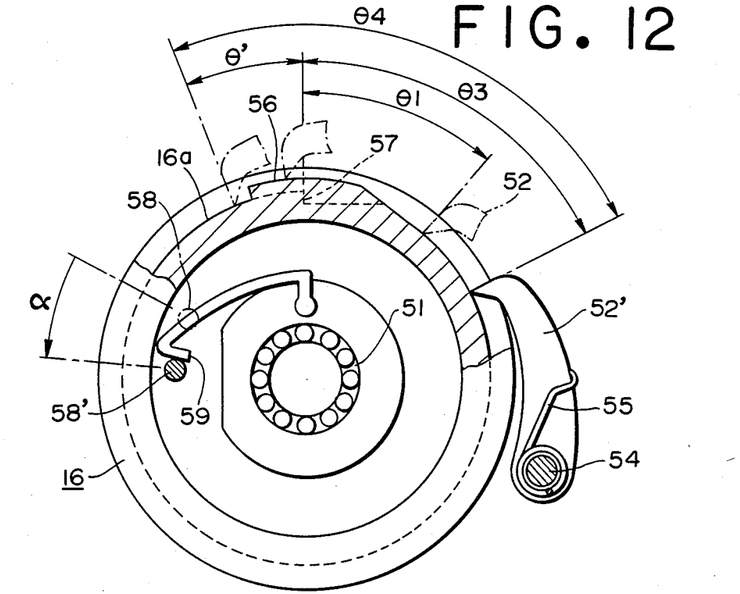
FIG. 12 illustrates relation between the latch plate and a latch pole when a home position of the clutch mechanism shown in FIG. 7 is shifted.

FIG. 12 illustrates another embodiment in which a plurality of clutch mechanisms are used so that the individual clutch mechanisms are actuated separately. In FIG. 12, the position of the positioning pin 58 which determines the position of the latch pawl 52 with respect to the pawl hole 57 is set at a position 58' by moving it backwardly by an angle $\alpha$ from the position shown in FIG. 10 so that, when the positioning pin at the position 58' contacts with the stopper plate 59, the latch pawl 52' makes an angle $\theta 3$ with respect to the pawl hole 57. With this structure, the selection between the clutch mechanisms 50 and 50' can be performed precisely by selecting the angle, within which the latch pawl 52 effectively functions, between $\theta 2$ (FIG. 10) and $\theta 4$ (FIG. 12).

The operation of the present paper sheet feeding apparatus equipped with the clutch mechanism will be described herein after.

When it is desired to derive one of the paper sheets 11 from the cassette 10 through the paper sheet feed rollers 8, the platen 1 is rotated in the reverse direction by an angle corresponding to, for example, 7 printing lines. With this reverse rotation of the platen 1, the clutch plates 15 and 15' are rotated in the Y direction through the transmission gears 7 and 7' of the clutch mechanisms 50 and 50' by the angle $\theta 2$, respectively. In this case, the reverse rotation of the transmission gears 7 and 7' are started from a position in which the pin 58 is held by the stopper 59 when these gears run idle with respect to the clutch plate 16 during a preceding forward rotation of the platen, i.e., the predetermined home position of the engaged latch pawl 52 and the pawl hole 57.

Therefore, with the rotation of the clutch plate 15 in the Y direction, the top end of the latch pawl 52 moves by a distance corresponding to the angle $\theta 2 = \theta 1 + \theta'$, as shown in FIG. 10, and passes over the switch portion 56. However, the latch pawl 52' rides on the switch portion 56 since the angle $\theta 3$ is larger than the angle $\theta 1$, as shown in FIG. 12. When the platen 1 rotates in the forward direction by an angle corresponding to 2 printing lines and the top end portion 52a of the latch pawl 52 is retracted by the angle of $\theta'$, only the latch pawl 52 of the clutch mechanism 50 is caught by the pawl hole 57.

Thus, when the platen 1 is rotated in the reverse direction from the above mentioned state, the latch pawl 52 can be engaged with the pawl hole 57, so that the clutch plates 15 and 16 are coupled together and thus the roller shaft 6 rotates in the Y direction with the forward rotation of the clutch mechanism 50. Therefore, the paper sheet in the cassette 10 is fed to the platen 1. The feeding of the paper sheet is performed to an extent that the front end portion of the paper sheet 11 reaches the feeding opening of the platen 1 and slightly bent so that by changing the rotational direction of the platen 1 to the forward direction under such condition, the paper sheet can be easily pulled in the platen. With this forward rotation of the platen 1, the clutch plate 15 is rotated in the X direction to automatically release the coupling of the latch pawl 52. Once the paper sheet 11 is pulled in the platen 1, the feed rollers 8 become idle regardless of the operation of the clutch mechanism 50.

Therefore, with using the clutch mechanism 50 according to the present invention, the automatic feeding of the paper sheet and the selection of the paper sheets to be fed are facilitated reliably. The switching from the clutch mechanism 50 to the other mechanism 50' can be easily performed according to a program by rotating the platen 1 in the reverse direction by an angle corresponding to, for example, 9 printing lines and then in the forward direction by an angle corresponding to 2 printing lines.

What is claimed is:

1. A paper sheet feeding apparatus for feeding sheets of paper to be printed in a printer machine comprising:
   a platen around which a paper sheet is fed and advanced for printing;
   a drive mechanism connected to said platen for driving it in forward or reverse directions;
   a paper sheet feed roller for feeding paper sheets to said platen; and
   a clutch mechanism including coupling means for coupling said paper sheet feed roller to said drive mechanism when said drive mechanism is operated to rotate said platen in the forward direction by a first predetermined amount, such that said paper sheet feed roller is driven to feed a paper sheet to said platen and said paper sheet is pulled in said platen, and for then disengaging said paper sheet feed roller from said drive mechanism when said drive mechanism is operated to rotate said platen in the reverse direction by a second predetermined amount, such that said platen can thereafter be rotated in a forward direction to advance the paper sheet line by line for printing with said paper sheet feed roller disengaged and freely rotatable;
   said clutch mechanism including first, second, and third clutch plates, said first and second clutch plates being rotatably supported by a shaft on which said feed rollers are fixedly mounted, a feed pawl mounted on a surface of said first clutch plate in the side of said second clutch plate, a receiving pawl mounted on a surface of said second clutch plate in the side of said first clutch plate for selectively receiving said feed pawl, a latch pawl mounted on a surface of said third clutch plate in the side of said second clutch plate for being engaged through a connecting shaft with said receiving pawl, and a ratchet wheel mounted on said surface of said third clutch plate for meshing with said latch pawl.

2. The paper sheet feeding apparatus as claimed in claim 1, wherein said coupling means further includes a lock lever mounted on said second clutch plate for selectively locking said receiving pawl.

3. A paper sheet feeding apparatus for feeding sheets of paper to be printed in a printer machine comprising:
   a platen around which a paper sheet is fed and advanced for printing;
   a drive mechanism connected to said platen for driving it in forward or reverse directions;
   a paper sheet feed roller for feeding paper sheets to said platen; and
   a clutch mechanism including coupling means for coupling said paper sheet feed roller to said drive mechanism when said drive mechanism is operated to rotate said platen in the forward direction by a first predetermined amount, such that said paper sheet feed roller is driven to feed a paper sheet to said platen and said paper sheet is pulled in said platen, and for then disengaging said paper sheet feed roller from said drive mechanism when said drive mechanism is operated to rotate said platen in the reverse direction by a second predetermined amount, such that said platen can thereafter be rotated in a forward direction to advance the paper sheet for printing;
   said clutch mechanism including first and second clutch plates, said first and second clutch plates being rotatably supported by a shaft on which said feed roller is mounted, a latch pawl protruding from said first clutch plate and said second clutch having an annular slide surface formed thereon with a first and a second area a pawl hole formed in the second area for engaging with said latch pawl, said latch pawl being slidably movable along said annular slide surface.

4. The paper sheet feeding apparatus as claimed in claim 3, wherein said latch pawl is rotatably supported by a support shaft implanted in said first clutch plate and biased by a spring wound on said support shaft towards a rotation center of said first clutch plate so that a top end portion of said latch pawl is swingable to the first area of said annular slide surface of said second clutch plate, said second clutch plate being rotatable freely with respect to said first clutch plate when said top end portion of said latch pawl is in contact with said first area of said annular slide surface of said second clutch plate.

5. The paper sheet feeding apparatus as claimed in claim 4, wherein a pawl switch portion is formed on said first area of said annular slide surface of said second clutch plate, said pawl switch portion having a slanted switching cam surface.

6. The paper sheet feeding apparatus as claimed in any of claim 5, wherein said latch pawl is shiftable from said first area of said annular surface of said second clutch plate through said slanted cam surface to said second area of said annular surface of said second clutch plate and said pawl hole is formed in said second area of said annular surface.

7. The paper sheet feeding apparatus as claimed in claim 3, wherein said coupling means further comprises a home position holding means for maintaining a relative position of said latch pawl to said pawl hole constant during said first and second clutch plates are rotating together freely with respect to said feed rollers, said home position holding means including a positioning pin protruding from said surface of said first clutch plate in the side of said second clutch plate and a stopper having one end fixedly secured to said surface of said second clutch plate in the side of said first clutch plate and the other end being free for holding said positioning pin when said first clutch plate is rotated in said first direction.

8. A paper sheet feeding apparatus as claimed in claim 4, wherein the first area and second area of said second clutch plate are arranged on a peripheral side face thereof.

9. A paper sheet feeding apparatus, as claimed in claim 1, wherein said first area and said second area are arranged side by side.

10. A paper sheet feeding apparatus as claimed in claim 4, wherein said spring is formed as a coil spring wound on said support shaft.

11. A paper sheet feeding apparatus as claimed in claim 4, wherein said second clutch is supported by a one way clutch.

* * * * *